Feb. 3, 1970  E. M. KNIBIEHLY ET AL  3,492,933
WIDE FILM PROCESSOR TRANSPORT SYSTEMS
Filed March 4, 1968  5 Sheets-Sheet 1
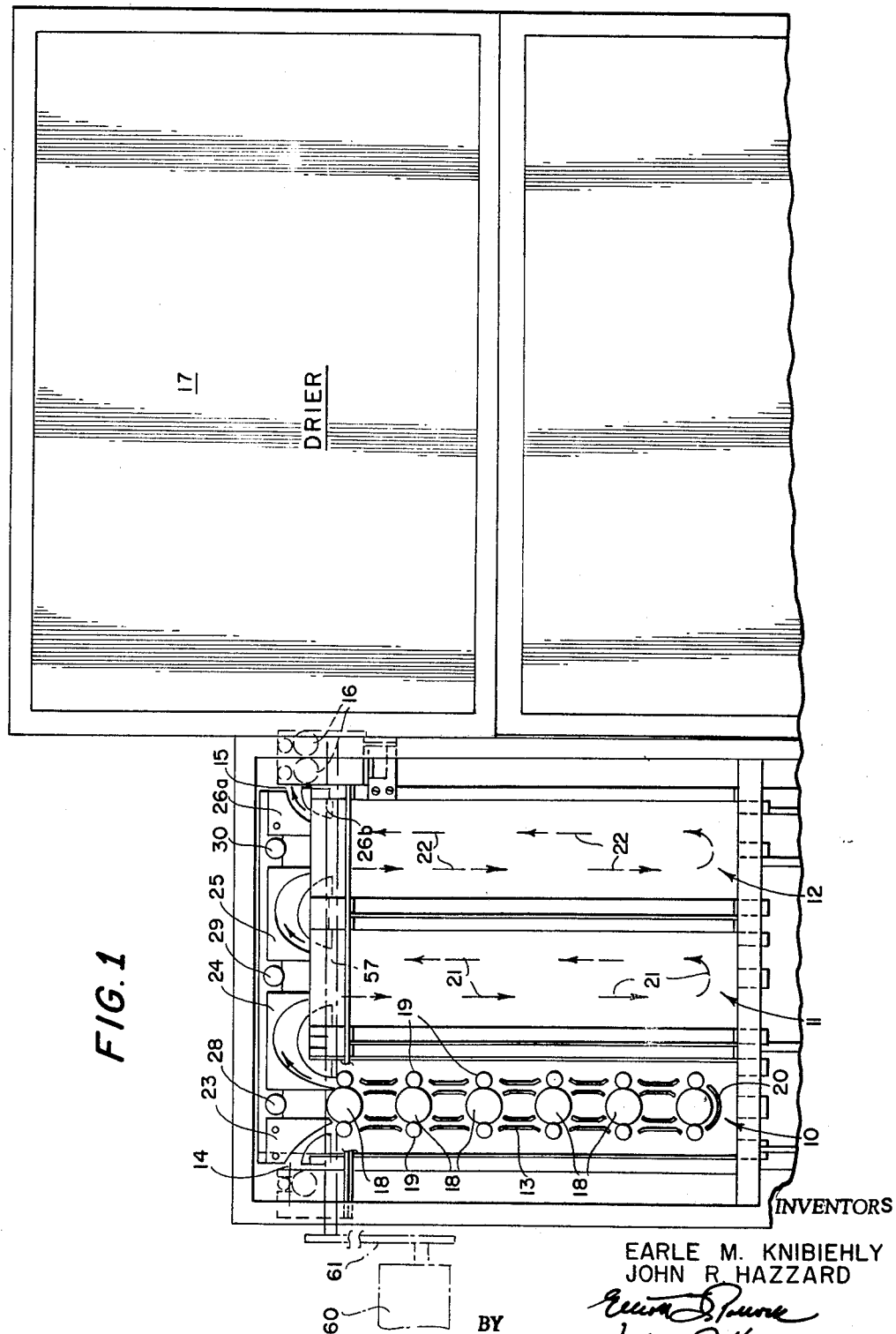
INVENTORS
EARLE M. KNIBIEHLY
JOHN R. HAZZARD
ATTORNEYS

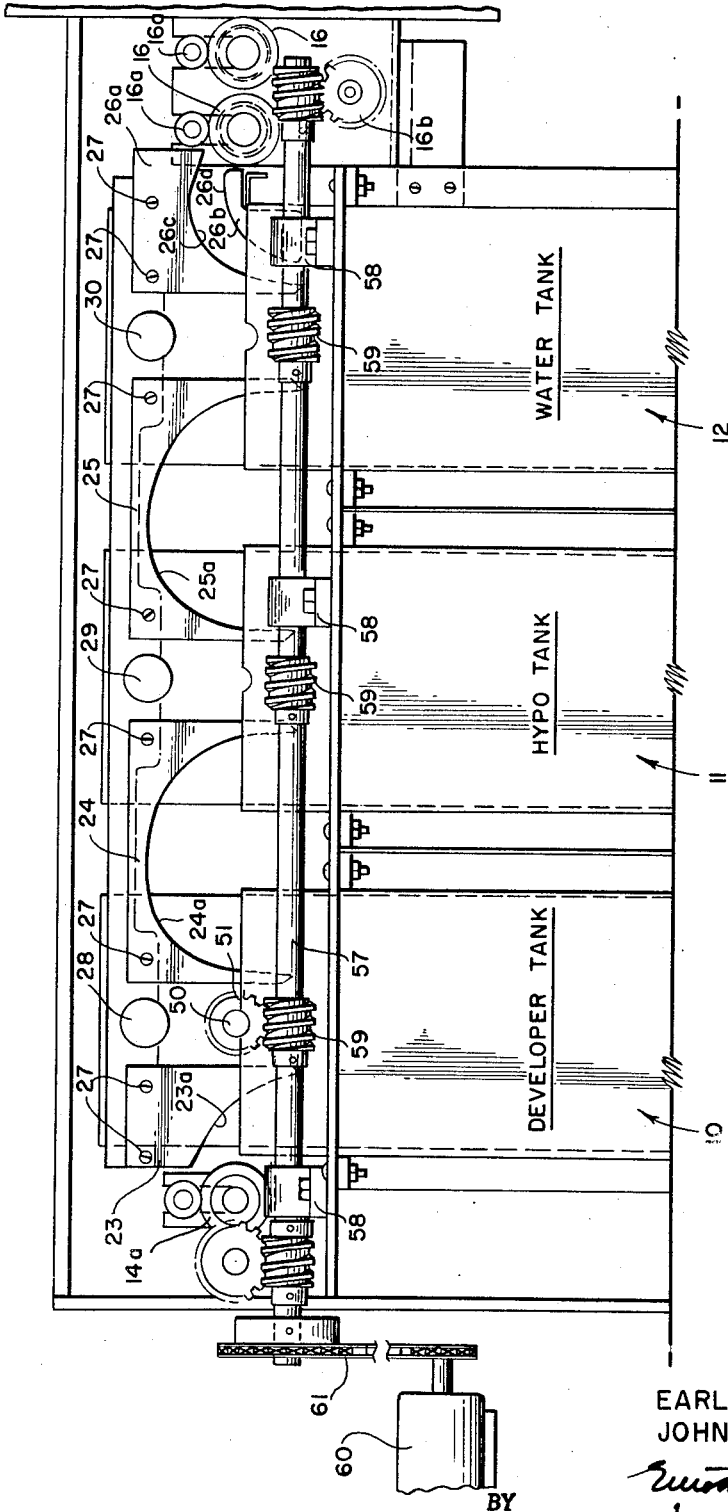

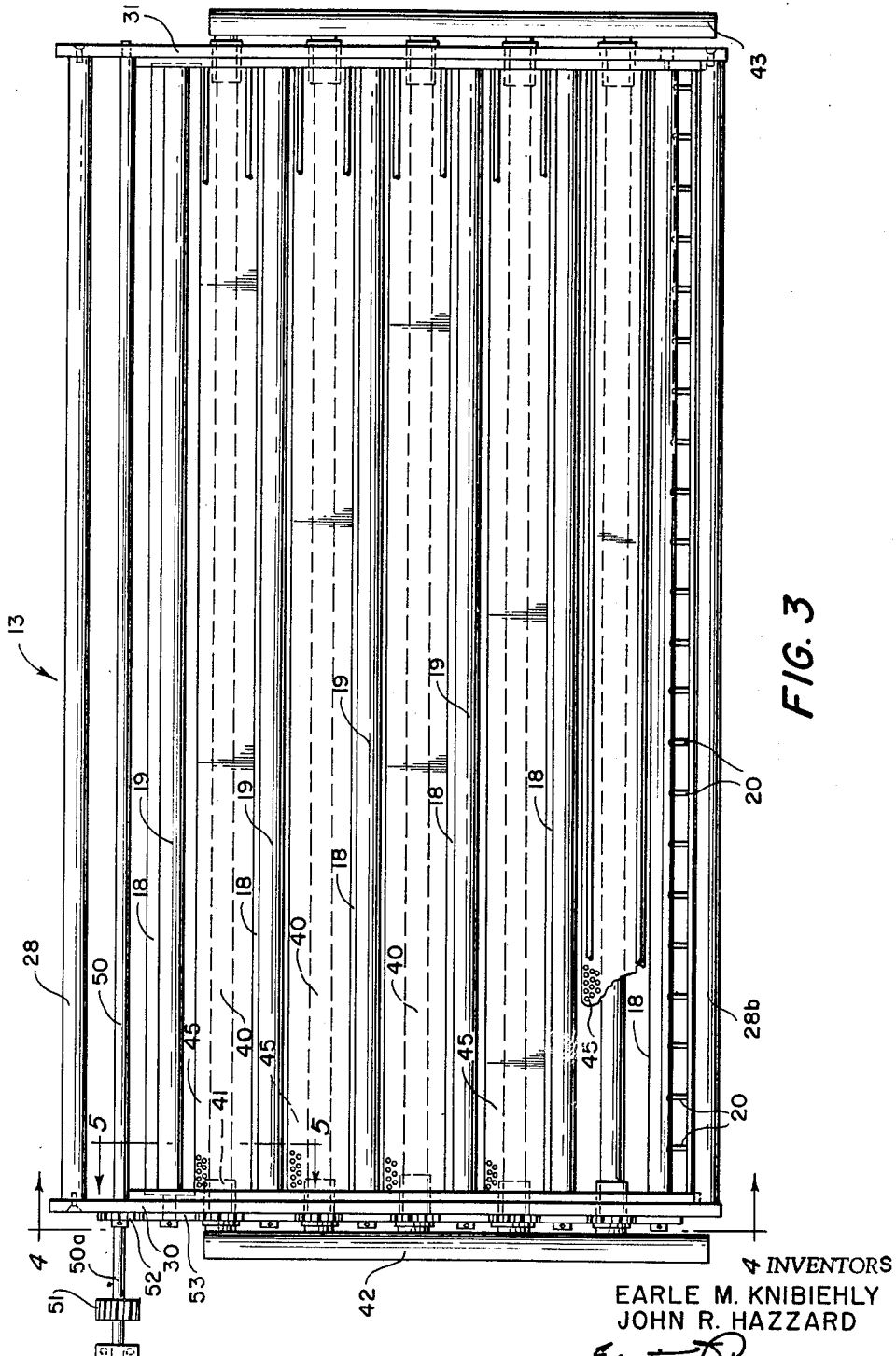

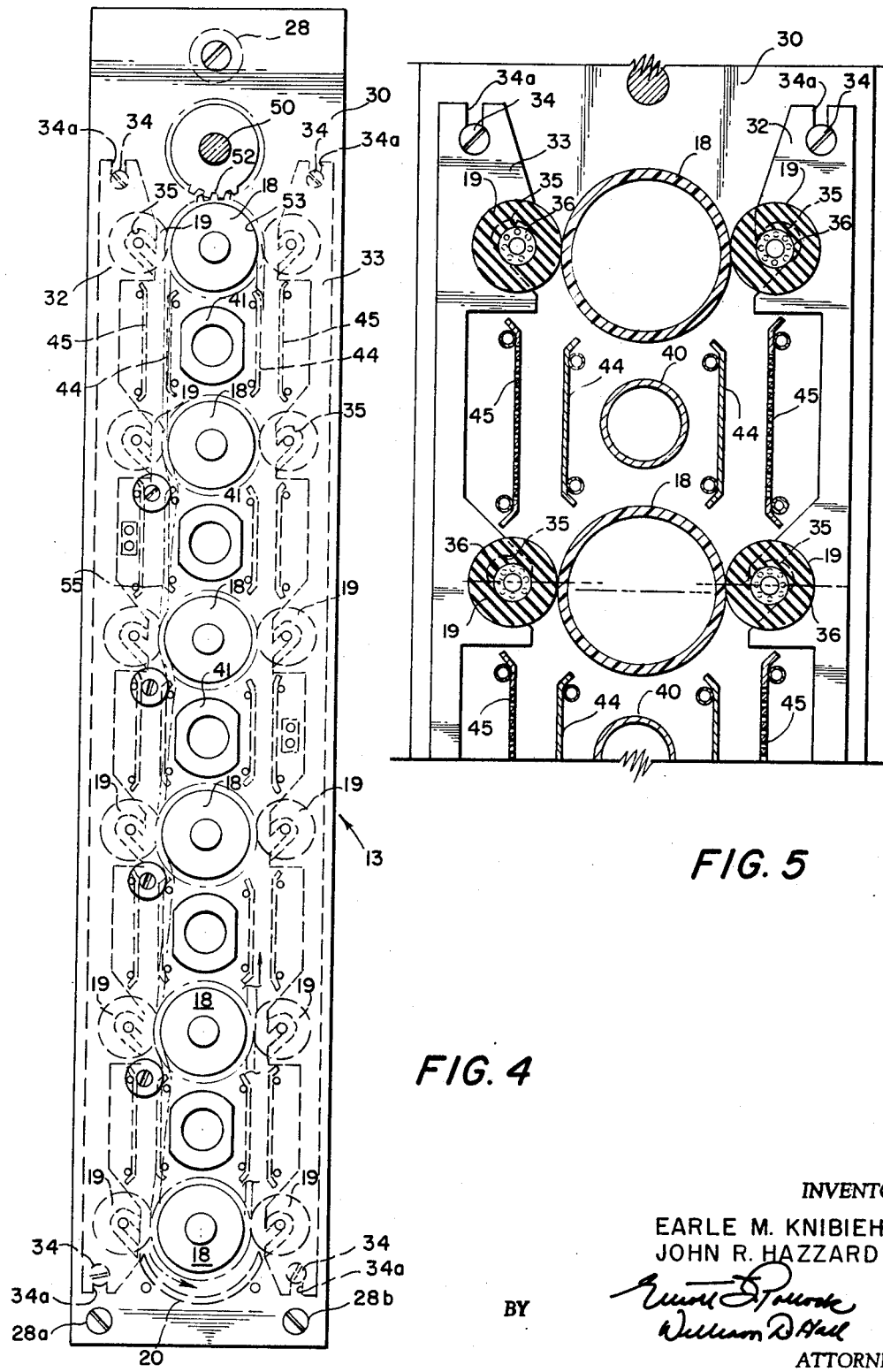

Feb. 3, 1970   E. M. KNIBIEHLY ET AL   3,492,933
WIDE FILM PROCESSOR TRANSPORT SYSTEMS
Filed March 4, 1968   5 Sheets-Sheet 5

INVENTORS
EARLE M. KNIBIEHLY
JOHN R. HAZZARD
BY
ATTORNEYS

൩,൪൯൨,൯൩൩
WIDE FILM PROCESSOR TRANSPORT SYSTEMS
Earle M. Knibiehly, Annandale, Va., and John Russell
 Hazzard, Washington, D.C., assignors to LogEtronics
 Inc., Springfield, Va., a corporation of Delaware
Filed Mar. 4, 1968, Ser. No. 711,466
Int. Cl. G03d 3/12
U.S. Cl. 95—94                                    12 Claims

ABSTRACT OF THE DISCLOSURE

A transport system is provided comprising a plurality of elongated drive rollers submerged within a fluid-filled tank. Each drive roller is constructed to exhibit positive buoyancy within the fluid. Negative buoyancy idler rollers are mounted to move, under the influence of gravity, into contact with each drive roller, the mounting of the idler rollers being such that they are self-adjusting and automatically align thermselves with respect to the drive roller.

BACKGROUND OF THE INVENTION

Automatic equipments adapted to process relatively large sheets or rolls of photographic film or paper are in themselves well known. Characteristically, such processors comprise a plurality of tanks consisting, in general, of a developer tank, a fixer tank and one or more wash tanks; and an appropriate transport system is associated with these several tanks for transporting the sensitized material from one to the next of said tanks in succession. The developed material is automatically passed from the last wash tank through squeegee rollers, and then through an appropriate drying section of the equipment.

Various forms of transport systems have been suggested heretofore for moving material being processed through the several processor tanks. One typical such system employs a plurality of rollers associated with belts disposed adjacent said rollers. A sheet of film passes between the rollers and belts, and the belts may be appropriately driven to transport the sheet through a given tank. Systems of this type can be designed to receive and transport film sheets of various widths. However, belts are relatively expensive. Moreover, any given transport system ordinarily employs a relatively large number of narrow belts disposed in side-by-side relation to one another; and the characteristics of the individual belts may vary from one belt to another when initially installed, and as the belts age, thereby imposing problems in the adjustment and replacement of individual belts. In addition, the belts sometimes leave cosmetic markings on the back or base side of some processed films.

To avoid some of these disadvantages, efforts have been made to provide transport systems which comprise only rollers. In systems of this type, a plurality of elongated rollers are mounted in generally parallel relation to one another; and the sheet of film being processed is caused to move from one to the next of said rollers. Such an all-roller system is more economical to manufacture and maintain than a composite roller-belt system. Moreover, an all-roller transport system minimizes the adjustment and cosmetic marking problems which have characterized some belt systems in the past. However, in practice, all-roller transport systems of types suggested heretofore are not well suited to the processing of relatively wide sheets or rolls of film or paper, or to the simultaneous processing of materials of differing thickness.

More particularly, if it is desired to provide a processor capable of transporting sheets or rolls of material having widths in the order of 42 inches to 62 inches, the lengths of the rollers in an all-rollers transport system must be equal to or greater than the width of the material being transported. When an effort is made to mechanically support rollers of these lengths by the roller ends, the very length and weight of the roller causes the roller to sag between its support points. Such sag is often of the same order of magnitude, at the center of the roller, as the thickness of the material being processed whereby significant pressure differences may occur across the width of the material. Since the materials being processed are often pressure sensitive, the sag provides a definite limitation on the roller length which can be used in any practical system, and precludes the use of conventional all-roller transport systems in processors intended to transport very wide materials.

The present invention, recognizing the difficulties which result when one merely attempts to increase the length of rollers in a conventional all-roller system to accommodate wider sheets of material, provides a new form of all-roller transport system wherein the rollers exhibit zero sag across 42 inches or even 62 inches of roller length. The arrangement is such that the economies and efficiencies characteristic of all-roller transport systems can be achieved even in the processing of relatively wide materials.

In addition to the foregoing factors, problems sometimes arise by reason of the fact that the base thickness of films which it may be desired to process can vary between three and eight mils. Known transport systems are not ordinarily capable of accommodating materials having different thicknesses throughout this entire range; and therefore are either restricted to use with materials of a particular thickness, or else require careful readjustment when there is a change in the thickness of the materials being processed to avoid pressure marking of the material. The present invention provides a roller transport system which is self-adjusting so that materials of various different thicknesses can be automatically accommodated in sequence, or accommodated simultaneously in side-by-side relation. Moreover, the arrangement is such that substantially the same roller pressure is imposed on all materials being processed regardless of their individual thickness, and regardless of any changes in thickness which may occur from one piece of material to another.

SUMMARY OF THE INVENTION

In accordance with the present invention, an automatic processor of the dry-to-dry type is provided. The processor included a plurality of tanks each of which contains a transport module having a novel all-roller arrangement. The several transport modules are interchangeable as units from one tank to the next so that they may be rotated periodically for self-cleaning. Stationary cross-overs extend between the tanks so that sensitized material transported through one tank by the module associated therewith is automatically led into the next tank for further transport by its transport module. The inter-tank cross-overs comprise guide plates so shaped that only the leading edge of the material being transported touches the guides as the material moves between tanks.

The transport module within each tank comprises a plurality of main drive rollers horizontally disposed in parallel relation to one another and vertically aligned in a roller array. These main rollers are associated with appropriate drive means, and with a turn-around structure, operating to drive a sheet of film or the like through the tank in a U-shaped path extending downwardly along one side of the rollers and then back upwardly adjacent the other side of the rollers. Each of the main drive rollers is fabricated in an appropriate form, e.g., as a sealed hollow tube, to exhibit positive buoyancy in photographic solution and in water so that said main drive rollers, even though supported at their opposing ends, exhibit zero sag when immersed in the fluid of their associated tank. The main drive rollers are fabricated to exhibit concentricity and surface uniformity (±0.001 inch) to achieve constant and uniform peripheral speed and consistent contact, and therefore uniform film pressure, against idler rollers (to be described).

Each main drive roller is associated with a pair of spaced smaller idler rollers which are also immersed within the tank containing the transport module, but fabricated to exhibit negative buoyancy in water or photographic solution. These smaller rollers have their opposing ends slidably and rotatably mounted in appropriate supporting structures. More particularly, support means are provided having a plurality of inclined slots adapted to hold the smaller rollers in position for rotation while simultaneously permitting the position of the axes of each pair of smaller rollers to vary relative to the axis of the main drive roller associated with said pair, so that materials of various different base thicknesses can be received sequentially or simultaneously, between each main drive roller and its associated smaller idler rollers.

The lines of tangent contact between each pair of idler rollers and their associated main drive roller differ in position, relative to the axis of the main drive roller, from one side to the other side of said main drive roller, to automatically compensate for the different force directions which are exerted on the idler rollers as a film sheet passes downwardly, and then upwardly in the opposite direction, through a given tank. The positions and angles of inclination of the inclined slots, in which the shafts of the idler rollers are mounted, are so selected that the idler rollers are biased to move slidably under the influence of gravity toward their associated main drive roller, and to engage each main drive roller along a line parallel to but slightly above the axis of said main drive roller. The overall arrangement is operative to produce a desired relatively constant pressure of preselected magnitude between each idler roller and its associated main roller.

Each transport module further includes a plurality of elongated turbulator tubes extending in generally parallel relation to the main drive rollers, and located respectively between said main drive rollers. The turbulator tubes, and their positional and operational relationship to the main drive rollers, correspond to the arrangement described in Knibiehly copending U.S. patent application Ser. No. 567,890, filed July 26, 1966. The tubes are associated with manifolds arranged to engage and disengage in fixed stand-pipes disposed in the bottom of each tank. An appropriate pumping mechanism produces a circulation of the fluid contained in a given tank via the turbulator tubes while film is being processed, thereby to permit the fluid in each tank to be replenished, recirculated, and re-injected at several levels in each tank, and particularly in the case of the developer and fixing solutions, to effect rapid homogenizing of the injected fluid with the working solutions. The overall arrangement thus achieves the various advantages described in the aforementioned prior copending Knibiehly application in conjunction with the further improvements realized by the novel transport system of the instant application.

BRIEF DESCRIPTION OF THE DRAWINGS

FIGURE 1 is a diagrammatic side view of a film processor employing the transport system of the present invention;

FIGURE 2 is a detail view of a portion of the structure shown in FIGURE 1, illustrating the drive mechanism employed:

FIGURE 3 is a side view of a transport module constructed in accordance with the present invention;

FIGURE 4 is an end view of the transport module of FIGURE 3, taken on line 4—4 of FIGURE 3;

FIGURE 5 is a detail view of a portion of the structure shown in FIGURE 3, taken on line 5—5 of FIGURE 3;

DESCRIPTION OF THE PREFERRED EMBODIMENT

Figure 6:
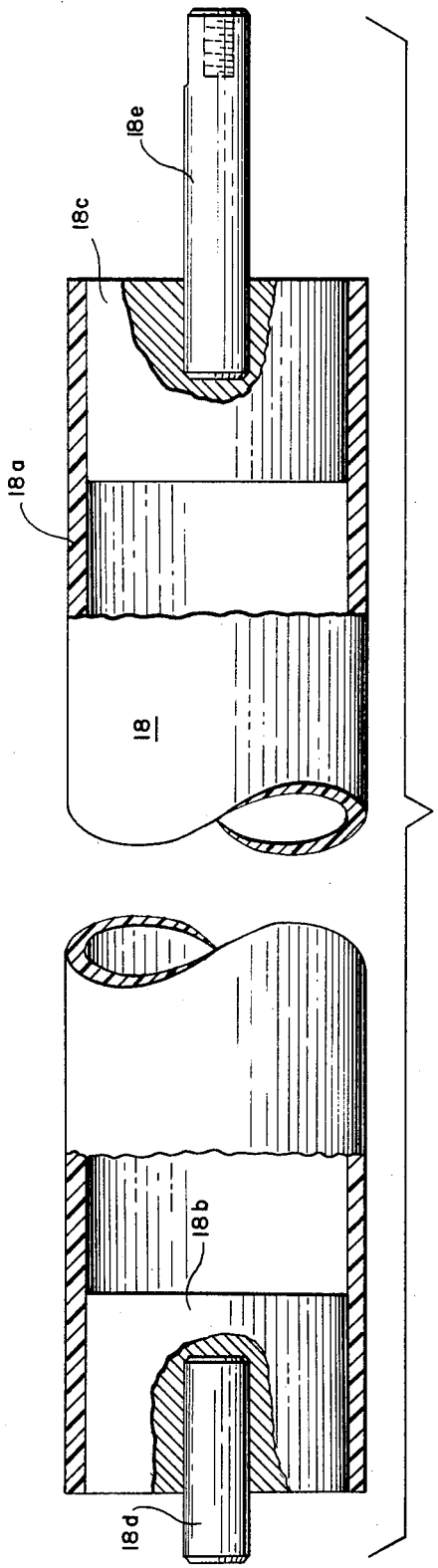
FIGURE 6 is a diagrammatic side view, in partial section, of a main drive roller used in the transport module of the present invention.

Referring initially to FIGURE 1, a film processor constructed in accordance with the present invention may comprise a plurality of processor tanks including a developer tank 10, a fixer or hypo tank 11 and one or more wash tanks 12. The several tanks each include a unitary removable transport module generally designated 13 adapted to receive a dry sheet of film at the inlet end 14 of the processor assembly and to pass said sheet through the tanks 10, 11 and 12 in sequence to an exit 15. In this respect the term "sheet" used herein is intended to encompass both continuous and cut lengths of material, and the term "film" used herein is intended to encompass any suitable type of material requiring processing. The processed sheet then passes through squeegee rollers 16 into a drier section generally designated 17, whereupon the processed and dried sheet emerges from the equipment for collection in an appropriate receptacle. The overall equipment thus operates as a dry-to-dry processor.

Each transport module 13 comprises a plurality of main drive rollers 18 submerged within the fluid of its respective tank and disposed in a generally horizontal direction. Each of several main drive rollers 18 is associated with a pair of idler rollers 19, and a turn-around means 20 is disposed adjacent the lowermost main drive roller, whereby a sheet of film is caused to pass through a given tank in a generally U-shaped path, passing downwardly between the main drive rollers 18 and idler rollers 19 along a path adjacent one side of the main drive rollers to the turn-around 20, and then back upwardly between the main drive rollers and idler rollers along a path adjacent the other side of the several main drive rollers. Turn-around 20 can comprise stationary curved guide means, as illustrated, or may take the form of additional rollers. Typical paths of movement of each film sheet through the processor tanks have been depicted by the arrows 21 and 22 in FIGURE 1. The material is fed into each module with its emulsion side "up," so that the emulsion side contacts the surface of the main drive rollers rather than the idler rollers.

In order to effect appropriate transport of the film sheet from one to the next tank, cross-over guide plates are provided between the several tanks. As shown in FIGURES 1 and 2, these cross-overs may comprise an entrance guide 23 adapted to lead a sheet of film into developer tank 10; a cross-over guide 24 leading a sheet of film from the exit side of developer tank 10 into the entrance side of hypo tank 11; a further cross-over 25 adapted to lead a sheet of film from the exit side of tank 11 into the entrance side of wash tank 12; and an exit guide structure comprising a top guide 26a and a bottom guide 26b adapted to lead a sheet of wet processed film from the exit side of wash tank 12 into the region between squeegee rollers 16 and cooperating pressure rollers 16a. The squeegee rollers may be driven from the main drive shaft 57 (to be described) by an appropriate transmission system comprising gear members 16b (see FIGURE 2).

Each of the guides 23, 24, 25, 26a and 26b includes a shaped guide edge of the types designated 23a, 24a, 25a, 26c and 26d (see FIG. 2). The shapes of these guide edges are developed empirically, based on the assumption that film stiffness is always sufficient to permit the first one and one half linear inches of film back from the leading edge of each sheet to remain essentially straight. Using this assumption, the curvatures of the guide edges are determined by effecting plots for each half-inch increment of advance of the film leading edge. The curvatures thus plotted are such that as a sheet of film is moved from one tank to the next the leading edge only of the film contacts the cross-over guide plate in question, with the remainder of the film sheet being freely spaced from the guide edge. This avoids any scratching or marking of the sheet during its passage into or out of each tank, and minimizes encrustation of the guide plates (which may also cause scratching) due to the deposit of chemicals on said guide plates. To this effect, it will be noted that the curvatures of the guiding edges such as 24a and 25a do not constitute perfect half-circles, nor do the curvatures of the edges 23a, 26c and 26d comprise segments of a circle.

The several guides 23, 24, 25, 26a, and 26b each take the form of sheet metal plates spaced from one another along horizontally extending support bars such as 27; and the guide plates, so supported, are in turn removably held in place on elongated tie rods 28, 29, and 30 which overlie respectively the tanks 10, 11 and 12. Each tie rod comprises a portion of the transport module for a given tank (see, for example, FIGS. 3 and 4) whereby said tie rods act to support the cross-overs between individual tanks, and also permit said cross-overs to be removed when it is desired to gain access to a given tank, or to remove a transport module from its associated tank.

As is best shown in FIGURES 3 through 5 inclusive, each transport module 13 comprises a pair of end plates 30 and 31 disposed in a generally vertical direction, and secured in horizontally spaced relation to one another by an upper tie rod such as 28, and by a pair of lower tie rods such as 28a and 28b. The several main drive rollers 18 are mounted between end plates 30 and 31, with each main drive roller having a pair of stub shafts 18d and 18e (see FIG. 6) at its opposing ends which are journaled in end plates 30 and 31 respectively. The construction of the main drive rollers 18, which will be discussed subsequently, is such that each roller exhibits positive buoyancy when immersed in the fluid of its associated tank. As a result, when so immersed, each main drive roller 18 exhibits zero sag between its ends notwithstanding the fact that the drive rollers are very long and are supported only at their opposing ends.

A pair of roller supports 32 and 33 are mounted on the inner surface of each end plate 30 and 31 by means of screws 34 passing through open ended slots 34a provided at the opposing ends of said roller supports. By this arrangement, the roller supports 32 and 33 can be adjusted within limits up or down relative to their associated end plates 30 and 31 to permit adjustments in the positions of the idler roller axes relative to the axes of the main drive rollers 18. Each roller support 32 and 33 is further provided with inclined slots 35 adapted to slidably receive the end shafts of idler rollers 19. The idler roller end shafts are preferably provided with ball bearings 36.

By reason of the fact that the end shafts of idler rollers 19 are mounted in slots 35, and since each slot 35 extends above the axis of an adjacent drive roller 18 and is inclined toward said driver roller 18, the several idler rollers 19 are caused to gravitate toward their adjacent main drive rollers 18. Two idler rollers are mounted adjacent each drive roller 18, on opposite sides respectively of each main drive roller 18. By this arrangement, each sheet of film being processed is caused to pass downwardly between said idler rollers and one side, or the "entry" side, of the main drive rollers and subsequently, after being guided around turn-around structure 20, passes upwardly between the other idler rollers and the opposite side, or "exit" side, of said main drive rollers.

Each module further includes a plurality of turbulator tubes 40 which extend in directions parallel to rollers 18 and 19 between end plates 30 and 31 at positions between adjacent drive rollers 18. Each end of each tube 40 engages a fitting 41 which extends through the end plate 30 or 31. Fittings 41 are adapted to removably receive tubular extensions from manifolds 42 and 43 on opposite sides of each module. The lower ends of the manifolds 42 and 43 removably engage fixed stand-pipes in the bottom of the tanks 10, 11 and 12; and said stand-pipes (not shown) are in turn coupled to a pumping mechanism operative to recirculate a supply of filtered fluid within each tank via the several turbulator tubes and their associated manifolds. The details of the turbulator tube structure may be further appreciated by reference to prior copending Knibiehly U.S. patent application Ser. No. 567,890 identified previously.

The end plates 30 and 31 further support a plurality of pairs of solid baffles 44, and a plurality of pairs of perforated baffles 45. Baffles 44 and 45 comprise elongated plates which extend parallel to one another in generally horizontal directions between the several main drive rollers 18 and adjacent to turbulator tubes 40. Individual baffles 44 and 45 on a given side of any tube 40 are horizontally spaced from one another relative to a line extending between the several regions of engagement of idler rollers 19 and their associated main drive rollers 18 whereby a sheet of film being processed passes between the adjacent baffles 44 and 45 on a given side of each tube 40. Solid baffles 44, which are closest to tubes 40, tend to protect the sheet of film from uneven processing resulting from extreme turbulence of the fluid in the immediate region of tubes 40. Perforated baffles 45, which are spaced outwardly from solid baffles 44, permit circulation of fluid past a sheet of film as it traverses a given tank. The adjacent pairs of baffles 44 and 45 further operate to confine the film sheet somewhat as it passes from one set of rollers to the next in a given tank. The actual film path is such that, under ordinary circumstances, the film is freely spaced from both baffles 44 and 45.

Each transport module 13 further includes an elongated drive shaft 50 rotatably mounted in end plates 30 and 31. Shaft 50 includes a shaft portion 50a extending outwardly from end plate 30 and carrying a gear 51 thereon for removable engagement with a main driving mechanism, to be described subsequently. Drive shaft 50 further carries a gear member 52 at a position closely adjacent the exterior of end plate 30; and gear 52 meshes with a further gear member 53 carried by an outwardly extending portion of the stub shaft 18e (see FIG. 6) of the uppermost main drive roller 18. The other main drive rollers 18 are arranged to be positively driven upon application of drive to the drive shaft 50 and the uppermost roller 18.

Positive drive from one to the next of rollers 18 can be effected by appropriate gearing assemblies extending between the several drive rollers 18. In the particular embodiment shown in FIGURE 4, the several main drive rollers 18 each include gear members, e.g., fabricated of plastic, carried by stub shafts 18e (FIG. 6) and disposed adjacent the outermost side of end plate 30, said gear members being interconnected to one another by a closed loop toothed timing belt 55 of a type well known in itself and commercially available. It will be appreciated, however, that any appropriate drive mechanism can be utilized, e.g., gear trains, chain drives, etc., so long as the mechanism operates to cause each of the rollers 18 to rotate in the same direction and in synchronism upon application of drive to a given module.

In order to apply drive to the rollers 18 of the several transport modules, as well as to the inlet feed rollers 14a and the squeegee rollers 16 of the processor section, an arrangement of the type shown in FIGURE 2 may be employed. More particularly, drive may be effected by means of an elongated shaft 57 extending along the tops of the several tanks 10, 11 and 12 and mounted for rotation in bearings 58. Shaft 57 carries a plurality of worm gears 59 which are respectively located at a central position relative to an exterior side of each of the several tanks 10, 11 and 12. Worm gears 59 are individually adapted to mesh with one of the gear members 51 carried by the main drive shaft 50 of each module. By this arrangement, when a module is lowered into place in its associated tank, gear member 51 of that module engages one of worm gears 59 so that rotation of shaft 57 imparts rotation to drive shaft 50 of the module and, thereby, drives the several main drive rollers 18 of that module in the manner described previously. Shaft 57 is driven by an appropriate motor 60 and chain drive 61. Motor 60 is preferably associated with a constant speed controller (not shown) to permit desired changes in the speed of film transport through the several tanks 10, 11 and 12.

Each of the main drive rollers 18 preferably takes the construction shown in FIGURE 6. More particularly, rollers 18 may comprise elongated hollow tubes 18a fabricated of acrylic plastic, or of other suitable inert material; and the exterior surface of each tube 18a is preferably lightly sand blasted to increase the frictional force between rollers 18 and a sheet of film. The opposing ends of the tubes 18a receive sealing and supporting plubs 18b and 18c into which, in turn, are press fitted, pinned, and sealed stainless steel stub shafts 18d and 18e. Shaft 18e, which is intended to extend completely through end plate 30, is longer than shaft 18d and is appropriately machined to receive and retain a gear member for the purposes already described. Tubes 18a should be watertight after plugs 18b and 18c are inserted in place. The main body of each tube 18a may be hollow, or filled with an inert gas (to resist fluid entry and to indicate, by bubbling, any leakage), or may otherwise contain or confine in place a light weight material such as a plastic foam. The overall roller 18 exhibits positive buoyancy along its length when said roller is immersed in the fluid of one of tanks 10 through 12. By making the main drive rollers buoyant, extremely long drive rollers 18 can be supported by their opposing ends alone without exhibiting any sag between said opposing ends so long as the drive roller is immersed in fluid.

Figure 7:
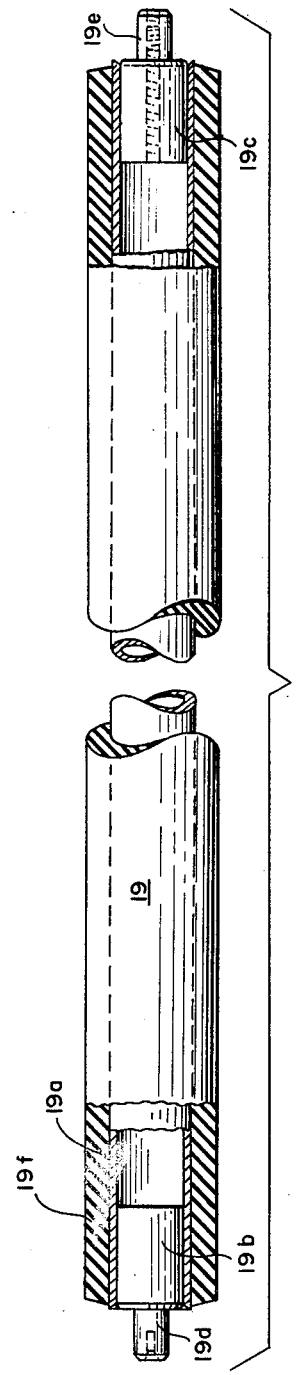
FIGURE 7 is a diagrammatic side view, in partial section, of an idler roller used in the transport module of the present invention.

The several idler rollers 19 may take the construction shown in FIGURE 7. More particularly, the idler rollers may comprise stainless steel tubes 19a which are provided with plugs 19b and 19c at their opposing ends to once more render them watertight. Plugs 19b and 19c carry shafts 19d and 19e adapted in turn to be slidably positioned in the downwardly inclined slots 35 of roller supports 32 and 33, as described earlier. Each of the stainless steel tubes 19a is surfaced with a layer of sulfur-free neoprene rubber 19f of between 10 and 55 durometer. In one apparatus which has been constructed and operated satisfactorily, it was found that the best range for the neoprene rubber coating 19f was between 35 and 55 durometer. However for equipment intended to handle continuous tone films, it may be preferable to use of softer rubber layer of approximately 10 durometer.

Notwithstanding the fact that the several idler rollers 19 are of hollow sealed configuration, the weight of the materials used in the construction of the several idler rollers cause rollers 19 to exhibit negative buoyancy, in contrast to the main drive rollers 18 which exhibit positive buoyancy. Because of this negative buoyancy characteristic of the idler rollers, idler rollers 19 tend to gravitate downwardly in their support slots 35 toward their associated main drive roller 18 until the idler rollers engage the main rollers tangentially. When a sheet of film passes between a given idler roller and its adjacent drive roller, the idler roller is moved away from the main drive roller, and upwardly in its support slots 35, by an amount which depends upon the film sheet thickness.

In a preferred embodiment of the invention, the roller supports 32 and 33 are constructed of an appropriate inert plastic, and the several slots 35 in both supports are inclined at the same angle, 45°, to the center line through the associated main drive roller. The positions of the constructed, the pressure produced between each idler roller 19 on the input side of each module contacts its associated main drive roller along a line spaced 1/16 inch above the center line of the main drive roller, and each idler roller on the output side of each module contacts its associated main drive roller along a line spaced 1/64 inch above the center line of the main drive roller. The actual points of contact can be adjusted, of course, by appropriate adjustment of the vertical position of the roller support structures 32 and 33. In any event, the line of engagement between each idler roller and its associated main drive roller should be slightly above center of the main drive roller to insure that a sheet of film is positively engaged between each main drive roller and an adjacent idler roller as said sheet passes both downwardly and upwardly. The actual force exerted between an individual idler roller and its associated main driver roller can be predetermined by appropriate selection of the materials employed in the idler rollers, the positioning of the idler rollers relative to their associated main drive rollers, and the angles of inclination of the slots 35 which cause said rollers to gravitate toward opposite sides of each main drive roller. In a preferred embodiment of the invention which has been actually constructed, the pressure produced between each idler roller and its associated main drive roller was one-half ounce per linear inch as measured in air.

As already described, the mounting of the idler rollers is such that the actual position of each idler roller relative to its main drive roller is self adjusting. When a film sheet is fed into a given module, the idler rollers will move upwardly in their associated inclined slots 35, against the force of gravity, and/or may surface compress to some extent, so as to automatically compensate for the sheet thickness. Similarly, due to the fact that the idler roller surface is compressible, if two or more sheets of differing thickness should be introduced simultaneously and side-by-side, the idler rolls will move, and laterally spaced portions thereof will compress appropriately, to maintain desired pressure on all sheets. Similar effects may be achieved by making the outer surfaces of the main drive rollers compressible, and the outer surfaces of the idler rollers substantially non-compressible. In this latter arrangement, the film sheet is preferably fed with is emulsion side next to the idler rollers, and the turn-around 20 preferably takes the form of additional rollers.

It will be appreciated, of course, that still other arrangements are possible. Thus, while the inclinations of slots 35 are the same on both the input and output side of each module in the particular embodiment described, i.e., 45°, in some embodiments the inclinations of the slots can be different, i.e., the inclination on the output side can be greater than that on the input side of each module to cause a greater force to be exerted in a downward direction between each output side idler roller and its associated main drive roller, thereby to compensate for the different force directions imposed on the idler rollers as a sheet of film passes downwardly and then upwardly through a given module. Similarly, if desired, other arrangements may be employed for permitting variations in the angles of attack or points of engagement between the idler rollers and their associated main drive roller. In all of these arrangements, however, it is important that the main drive rollers be made to exhibit positive buoyancy.

Transport systems constructed in accordance with the present invention permit the automatic processing of extremely wide sheets of film, and the simultaneous and sequential processing of film sheets of various different thicknesses. Major economies in manufacture are achieved due to the commonality of parts employed, the ease of assembly of those parts, and the fact that the system lends itself to injection moldings using PVC or other plastics for many of its parts. The transport modules are removable as units from the wet tanks, thereby facilitating maintenance or repair operations if they should become necessary. The removability feature is enhanced by the fact that use of buoyant rollers makes the overall assembly lighter in weight than would otherwise be the case. The removability of said transport modules from said tanks, and their ready interchangeability from one tank to another, also permits the modules to be rotated periodically between tanks for self-cleaning. By reason of all of these factors, and others which will be apparent from the preceding description, the overall system achieves significant improvements in manufacture, operation, and maintenance over systems suggested heretofore.

While we have thus described preferred embodiments of the present invention, other variations will be suggested to those skilled in the art. It must therefore be understood that the foregoing description is meant to be illustrative only, and not limitative of the present invention; and all such variations and modifications as are in accord with the principles described are meant to fall within the scope of the appended claims.

Having thus described our invention, we claim:

1. A transport system comprising a plurality of elongated drive rollers adapted to be submerged within a body of fluid, each of said drive rollers being constructed to exhibit positive buoyancy in said fluid when so submerged, means rotatably mounting said elongated buoyant drive rollers by their opposite ends in generally horizontal directions and in generally parallel relation to one another, drive means coupled to said buoyant drive rollers for rotating said plurality of drive rollers in synchronism with one another, a plurality of elongated idler rollers, and means for rotatably mounting said idler rollers in generally horizontal directions adjacent and generally parallel to said drive rollers.

2. The transport system of claim 1 wherein said idler rollers have a compressible outer surface whereby materials of different thickness may be transported simultaneously and in side-by-side relation to one another between said idler rollers and said drive rollers by causing laterally spaced portions of said compressible outer surface to compress to different extents.

3. The transport system of claim 1 wherein said idler rollers are also adapted to be submerged within said body of fluid, said ilder rollers being constructed to exhibit negative buoyancy in said fluid when so submerged.

4. The transport system of claim 1 wherein said mounting means includes means for varying the axial positions of said idler rollers relative to the axial positions of said elongated drive rollers.

5. The transport system of claim 3 wherein a pair of said elongated idler rollers are mounted to tangentially engage spaced linear portions of each of said elongated drive rollers, said mounting means for said idler rollers comprising support means defining inclined slots adapted to slidably receive shafts extending from the opposing ends of each of said pair of idler rollers, the direction of inclination of each of said slots being toward the drive roller associated with said pair of idler rollers whereby said pair of idler rollers are slidably movable and urged by gravity toward their associated drive roller.

6. The transport system of claim 5 wherein said support means and inclined slots are so positioned that the two lines of tangency between said pair of idler rollers and their associated drive roller are vertically located above the axis of rotation of said drive roller.

7. The transport system of claim 6 wherein said support means and inclined slots are so positioned that the two lines of tangency between said pair of idler rollers and their associated drive roller are located respectively at different vertical distances above the axis of rotation of said drive roller.

8. The transport system of claim 1 wherein each of said drive rollers comprises an elongated hollow tube provided with fluid-tight sealing means at its opposing ends.

9. The system of claim 8 wherein each of said hollow tubes comprises a plastic material.

10. The transport system of claim 1 wherein each of said idler rollers comprises an elongated cylindrical structure having a rubber-like coating on its exterior surface.

11. The transport system of claim 1 including a pair of generally vertically extending end plates forming a transport module insertable and removable as a unit from said fluid-filled tank, said module including means extending between said end plates for supporting said plates in fixed spaced relation to one another, said drive rollers extending between said pair of end plates with the opposing ends of each of said drive rollers being respectively mounted for rotation at fixed positions relative to said end plates, said mounting means being carried by said end plates, and said idler rollers extending between said end plates with the opposing ends of each of said idler rollers being carried by said mounting means for adjustable positioning relative to said end plates.

12. A film processing system comprising a tank containing a body of fluid therein, a transport system disposed within said tank for moving a sheet of film to be processed through said fluid, said transport system including a plurality of rotatable rollers submerged within said body of fluid, at least some of said rollers being constructed to exhibit positive buoyancy in said fluid whereby said buoyant rollers tend to be urged toward the upper surface of said body of fluid, means for restraining said buoyant rollers against movement toward the upper surface of said fluid, and means for rotating said rollers to transport a sheet of film through said body of fluid.

References Cited

UNITED STATES PATENTS

| | | | |
|---|---|---|---|
| 2,342,780 | 2/1944 | Zollinger | 95—94 |
| 2,918,069 | 12/1959 | Brown et al. | 95—89 X |
| 3,072,310 | 1/1963 | Kunz | 95—94 X |

JOHN M. HORAN, Primary Examiner

ROBERT W. ADAMS, Assistant Examiner